United States Patent [19]
Moriya et al.

[11] Patent Number: 5,256,472
[45] Date of Patent: * Oct. 26, 1993

[54] FLUORINE RESIN TYPE WEATHER-RESISTANT FILM

[75] Inventors: Yoshihisa Moriya; Mikio Shimizu; Masami Inoue, all of Machida, Japan

[73] Assignee: Denki Kagaku Kogyo Kabushiki Kaisha, Tokyo, Japan

[*] Notice: The portion of the term of this patent subsequent to Jul. 21, 2009 has been disclaimed.

[21] Appl. No.: 873,192

[22] Filed: Apr. 24, 1992

Related U.S. Application Data

[62] Division of Ser. No. 595,804, Oct. 10, 1990, Pat. No. 5,132,164.

[51] Int. Cl.$^5$ .............................................. B32B 27/08
[52] U.S. Cl. .................................. 428/215; 428/216; 428/220; 428/421
[58] Field of Search ............... 428/421, 216, 215, 199, 428/220; 425/131.1, 133.5; 264/171

[56] References Cited

U.S. PATENT DOCUMENTS

| | | | |
|---|---|---|---|
| 3,454,518 | 7/1969 | Kelly | 524/520 |
| 4,272,585 | 6/1981 | Strassel | 428/421 X |
| 4,317,860 | 3/1982 | Strassel | 428/421 |
| 4,415,519 | 11/1983 | Strassel | 425/133.5 |
| 4,444,826 | 4/1984 | Sasaki et al. | 428/216 |
| 5,132,164 | 7/1992 | Moriya et al. | 428/199 |

FOREIGN PATENT DOCUMENTS

| | | |
|---|---|---|
| 51-59971 | 5/1976 | Japan . |
| 61-8349 | 1/1986 | Japan . |
| 63-1984 | 1/1988 | Japan . |
| 64-90733 | 4/1989 | Japan . |

*Primary Examiner*—Thomas J. Herbert, Jr.
*Attorney, Agent, or Firm*—Oblon, Spivak, McClelland, Maier & Neustadt

[57] ABSTRACT

A fluorine resin type weather-resistant film of multi-layer structure comprising a front surface layer made of a composition (A) comprising, as main components, from 50 to 95 parts by weight of a vinylidene fluoride resin and from 5 to 50 parts by weight of a methacrylate resin and a rear surface layer made of a composition (B) comprising, as main components, from 50 to 95 parts by weight of a methacrylate resin, from 5 to 50 parts by weight of a vinylidene fluoride resin and from 0.1 to 15 parts by weight of an ultraviolet absorber, wherein the overall thickness of the film of multi-layer structure is from 10 to 150 μm, and the thickness of the front surface layer of the film is from 2 to 50 μm.

8 Claims, No Drawings

FLUORINE RESIN TYPE WEATHER-RESISTANT FILM

This is a division of application Ser. No. 07/595,804, filed on Oct. 10, 1990 now U.S. Pat. No. 5,132,164.

BACKGROUND OF THE INVENTION

Field of the Invention

The present invention relates to a surface-protecting film to be permanently or semipermanently laminated on the surface of a plastic, rubber, metal plate, glass, wood, slate or other substrate for the purpose of surface protection or decoration. More particularly, it relates to a fluorine resin type weather-resistant film which is excellent in the weather resistance, stain resistance, toughness such as chemical resistance, flexibility and adhesion to various substrates and which is particularly excellent in the bond durability after laminated on a substrate.

Discussion of Background

Heretofore, plastic plates, metal plates and various other substrates to be used as interior or exterior materials for buildings, used to be employed with their surface coated with coating materials or laminated with durable films (inclusive of those having printings applied).

The substrates to be subjected to surface treatment include plastic substrates such as polyvinyl chloride, polycarbonate, polymethyl methacrylate, an acrylonitrile-buthadiene-styrene copolymer and a fiber-reinforced plastic, various rubber substrates, metal substrates such as an aluminum-stainless steel-zinc steel plate, wood plates, glass plates and slates. Their applications extend to various fields including, in addition to wall papers and interior materials for elevators or vehicles, roof materials, wall materials, troughs, deck materials, garages, arcades, sun rooms, tents, agricultural materials, display boards, signboards, sound shielding walls, labels, window glasses, furnitures and house hold electric appliances.

Lamination of durable films to various substrates are usually conducted by means of various adhesives or heat lamination. Light is one of the main factors causing a problem of peeling, swelling or blistering at the bond interface. In either the case where various adhesives are used or the case where the bonding is conducted by heat lamination, an organic material such as a polymer material is present at least on one side of the bond interface. Particularly in the application to the exterior of buildings, such an organic material is subjected to irradiation of sunlight. Particularly the photon energy of the ultraviolet rays on the short wave length side is larger than the bond energy of molecules of the organic material, whereby the organic material tends to undergo rupture and degradation, and consequently the durability of bonding is hardly maintenable.

As a method for preventing the degradation of the organic material located at the bond interface, it is conceivable to impart a function of absorbing ultraviolet rays to the durable film itself. However, when the thickness of the durable film is thin, the production of a film having a good balance of various properties such as the physical strength of the film is technically difficult. Accordingly, a thick film is usually employed at the present. It is therefore desired to develop a durable film satisfying the above properties as soon as possible.

Heretofore, as durable materials, a coating material and film composed essentially of a vinylidene fluoride resin are known. For example, U.S. Pat. No. 3,454,518 discloses a coating material comprising methyl methacrylate (hereinafter referred to as PMMA), ethyl methacrylate and a vinylidene fluoride resin (hereinafter referred to as PVDF). Further, PVDF/PMMA/thermoplastic resin laminates are disclosed in Japanese Unexamined Patent Publication No. 59971/1976 and U.S. Pat. No. 4,272,585.

Further, U.S. Pat. Nos. 4,317,860, 4,415,519 and 4,444,826 disclose extrusion molded products of a PVDF/PMMA/thermoplastic resin. However, by any one of these methods, there has been obtained no film which is capable of being used for a long period of time as a weather-resistant product. Particularly, the interfacial bond strength between the PVDF layer and the PMMA layer is weak, and a peeling phenomenon is likely to result when the film is used for a long period of time.

It is an object of the present invention to provide a durable surface-protecting film excellent in the weather resistance, stain resistance, toughness such as chemical resistance, flexibility and adhesion to various substrates.

Another object of the present invention is to present a surface-protecting film excellent in the bond durability after lamination on various substrates.

The present inventors have conducted extensive researches to overcome the above problems. As a result, it has be found that when a multi layer film comprising (1) a front surface layer made of a mixture of PVDF and PMMA and (2) a rear surface layer or an intermediate layer made of a mixture comprising PVDF, PMMA and an ultraviolet absorber, is laminated on a thermoplastic resin as a substrate, the interfacial bond strength within the multi-layer film as well as the interfacial bond strength between the multi-layer film and the thermoplastic resin substrate is strong, and (3) evaporation or dissipation of the ultraviolet absorber can thereby be prevented, whereby the thermoplastic resin layer can be protected for a long period of time.

Further, it has been found that by coloring the above multi layer film with a composite oxide inorganic pigment and/or an inorganic pigment, when such a colored multi-layered film is laminated on a metal plate as a substrate, the interfacial bond strength between the colored film and the metal plate is strong and yet discoloration can be thereby prevented. The present invention has been accomplished on the basis of these discoveries.

Namely, the present invention provides:

1. A fluorine resin type weather-resistant film of multi-layer structure comprising a front surface layer made of a composition (A) comprising, as main components, from 50 to 95 parts by weight of a vinylidene fluoride resin and from 5 to 50 parts by weight of a methacrylate resin and a rear surface layer made of a composition (B) comprising, as main components, from 50 to 95 parts by weight of a methacrylate resin, from 5 to 50 parts by weight of a vinylidene fluoride resin and from 0.1 to 15 parts by weight of an ultraviolet absorber, wherein the overall thickness of the film of multi-layer structure is from 10 to 150 μm, and the thickness of the front surface layer of the film is from 2 to 50 μm.

2. A fluorine resin type weather-resistant film of multi-layer structure comprising a front surface layer and a rear surface layer both made of a composition (A) comprising, as main component, from 50 to 95 parts by weight of a vinylidene fluoride resin and from 5 to 50 parts by weight of a methacrylate resin and an intermediate layer made of a composition (B) comprising, as main components, from 50 to 95 parts by weight of a methacrylate resin, from 5 to 50 parts by weight of a vinylidene fluoride resin and from 0.1 to 15 parts by weight of an ultraviolet absorber, wherein the overall thickness of the film of multi-layer structure is from 10 to 150 μm, and the thickness of the front surface layer of the film is from 2 to 50 μm.

3. The fluorine resin type weather-resistant film according to item 1 or 2, wherein the film of multi-layer structure is colored with a composite oxide inorganic pigment and/or an inorganic pigment and has a covering power of at least 98% as represented by the contrast ratio calculated by the following formula from the values measured in accordance with JIS K-7105:

Contrast ratio $= Y_B/Y_W \times 100$ (%)

wherein $Y_B$ is the reflectance measured on a black substrate, and $Y_W$ is the reflectance measured on a white substrate.

Now, the present invention will be described in detail with reference to the preferred embodiments.

PVDF to be used for the composition (A) and the composition (B) in the present invention is a homopolymer of vinylidene fluoride or a copolymer of vinylidene fluoride with a monomer copolymerizable therewith. The copolymerizable monomer may be, for example, ethylene tetrafluoride, propylene hexafluoride, chloroethylene trifluoride or vinyl fluoride.

PMMA is a homopolymer of methyl methacrylate or a copolymer of methyl methacrylate with a monomer copolymerizable therewith, or a blend of polymethyl methacrylate and acrylate rubber. The copolymerizable monomer may be, for example, a $C_2$-$C_4$ methacrylate, a $C_1$-$C_8$ acrylate such as butyl acrylate, styrene, α-methyl styrene, acrylonitrile, acrylic acid or other ethylenically unsaturated monomer.

The ultraviolet absorber for the composition (B) in the present invention, may be any ultraviolet absorber so long as it is compatible with the resin to be used for the composition (B). To prevent the evaporation or dissipation, an ultraviolet absorber having a high molecular weight is preferred. As such an ultraviolet absorber, a benzotriazole type ultraviolet absorber, an oxalic acid type ultraviolet absorber, a benzophenone type ultraviolet absorber, a hindered amine type ultraviolet absorber and many other types of known ultraviolet absorbers may be employed. More specifically, 2-[3,5-di-(α-dimethylbenzil-2-hydroxyphenyl] benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-ethoxy-2'-ethyl oxalic acid bisanilide, 2-ethoxy-5-t-butyl-2'-ethyl oxalic acid bisanilide, 2-hydroxy-4-n-octoxy benzophenone, bis(1,2,2,6,6-pentamethyl-4-piperidyl) sebacate, bis(1,2,2,6,6-tetramethyl-4-piperidyl) sebacate, dimethyl-2-(4-hydroxy-2,2,6,6-tetramethyl-1-piperidyl)ether, 1-[2-3-(3,5-di-t-butyl-4-hydroxyphenyl)propyonyloxy]-2,2,6,6-T tetramethyl piperidine, may be mentioned.

As the main components for the composition (A) constituting the front surface layer and the rear surface layer of the present invention, PVDF and PMMA are employed, and the respective contents are from 50 to 95 parts by weight, preferably from 70 to 95 parts by weight, of PVDF and from 5 to 50 parts by weight, preferably from 5 to 30 parts by weight, of PMMA. If the content of PVDF exceeds 95 parts by weight, the adhesion to other layer tends to be poor, thus leading to feeling, such being undesirable. On the other hand, if the content is less than 50 parts by weight, the weather resistance tends to be low, whereby the effects as a protecting layer will be low, and blocking among the films tends to occur, whereby it becomes difficult to handle them as final products.

The content of an ultraviolet absorber in the front surface layer and the rear surface layer of the present invention is from 0 to 1 parts by weight, preferably from 0 to 0.5 part by weight, per 100 parts by weight of the total amount of PVDF and PMMA. If the content of the ultraviolet absorber exceeds 1 part by weight, the ultraviolet absorber is likely to bleed out on the surface of the film, whereby the interfacial bond strength with other film will be low, such being undesirable.

Next, as the main components for the composition (B) constituting the rear surface layer and the intermediate layer in the present invention, PVDF, PMMA and an ultraviolet absorber are employed. PMMA is from 50 to 95 parts by weight, preferably from 70 to 90 parts by weight, and PVDF is from 5 to 50 parts by weight, preferably from 10 to 30 parts by weight. If the content of PMMA is less than 50 parts by weight, the dispersion of the ultraviolet absorber tends to be inadequate, and evaporation or dissipation of the ultraviolet absorber is likely to take place, such being undesirable. On the other hand, if the content of PMMA exceeds 95 parts by weight, the bond strength between the front surface layer made of the composition (A) and the rear surface layer film tends to be poor, thus leading to peeling, such being undesirable.

The content of the ultraviolet absorber is from 0.1 to 15 parts by weight, preferably from 0.5 to 5 parts by weight, per 100 parts by weight of the total amount of PMMA and PVDF. If the content of the ultraviolet absorber is less than 0.1 part by weight, the quantity of the ultraviolet rays absorbed is small, whereby the performance as the protective layer will be inadequate. On the other hand, if the content exceeds 15 parts by weight, no additional effects will be obtained, and the cost increases.

The composition (A) and the composition (B) of the present invention may contain an antioxidant, a dispersing agent, a coupling agent, etc.

Further, the colorant to be used for coloring the composite film of the present invention, is preferably of an inorganic pigment type from the viewpoint of the weather resistance. For example, composite oxide type inorganic pigments may be used as the main color pigments, wherein two or more metal oxides form a new crystal structure by sintering and which are believed to develop colors by the decomposition of the crystal field. Typical composite oxide type inorganic pigments which are presently commercially available include a titanium yellow type having a rutile type or friedelite type crystal structure composed essentially of $TiO_2.Sb_2O_3.BaO.NiO.Cr_2O_3$, a zinc-iron brown having a spinnel crystal structure composed essentially of $ZnO.Fe_2O_3.Cr_2O_3$, a cobalt-blue type having a spinnel crystal structure composed essentially of $CoO.Al_2O_3.Cr_2O_3$, a green type composed essentially of $TiO_2.CoO.NiO.ZnO$, a black type having a spinnel structure composed of $CuO.Cr_2O_3$ and $CuO.Fe_2O_3.Mn_2O_3$, and a violet type comprising $CoO$ and $Mn_2O_3$. Further, together with such color pigments, rutile type titanium oxide, zinc white, calcium carbonate, barium sulfate as well as other inorganic pigments, may be used.

As the covering power of the colored composite film, a covering power of at least 98% is adopted as a contrast ratio calculated from the values measured in accordance with JIS K-7105. The covering power is obtained by the following formula by a contrast ratio method based on the measuring method by A. H. Pfund (Reference is made to Shikisai Kagaku Handbook, compiled by Nippon Shikisai Gakkai and published on July 31, 1980):

Contrast ratio = $Y_B/Y_W \times 100$ (%)

wherein $Y_B$ is the reflectance measured on a black substrate, and $Y_W$ is the reflectance measured on a white substrate.

If the contrast ratio is less than 98%, light enters through the colored film and reaches the bond interface between various materials, whereby degradation of the organic material at the interface will be caused, and the bond strength is likely to be lowered.

As a method for coloring the composite film, there may be employed either a method of coloring all the layers or a method of coloring only one layer, so long as the above contrast ratio will be at least 98%. The amount of the composite oxide inorganic pigment or an inorganic pigment is dependent upon the contrast ratio and is not particularly limited. However, taking the color tone (the composition of the pigment) into consideration, such a pigment is preferably used in an amount of from 1 to 50 parts by weight per 100 parts by weight of the overall resin composition of the composite film.

The weather-resistant film of the present invention is composed at least of two layers i.e. the front surface layer and the rear surface layer. But, it may be made into a multi-layer film wherein the composition (B) containing the ultraviolet absorber and the composition (A) containing no such ultraviolet absorber are disposed alternately to each other. Further, the weather-resistant film of the present invention has a thickness within a range of from 10 to 150 $\mu$m, preferably from 10 to 100 $\mu$m as the thickness of the entire film of multi-layer structure. If the thickness of the film is less than 10 $\mu$m, the whether resistance of the multi-layer film tends to be low, and degradation of the material is accelerated, and a substantial amount of an inorganic pigment has to be added to accomplish the covering power of at least 98% as the contrast ratio of the coloring, whereby the physical strength as the film will be impaired, and thus the film is practically useless. On the other hand, if the thickness of the film exceeds 150 $\mu$m, no further remarkable improvement of the weather resistance is obtainable, and the cost of the multi-layer film increases.

Further, with respect to the ratio in the thickness of the multi-layer film, the front surface layer film is from 2 to 50 $\mu$m. If the front surface layer film is less than 2 $\mu$m, the weather resistance, stain resistance and chemical resistance tend to be low. On the other hand, even if the thickness exceeds 50 $\mu$m, no further remarkable effects are obtainable, and the cost increases. Whereas, the film made of the composition (B) containing an ultraviolet absorber, is preferably at least 20% of the entire thickness of the multi-layered film. If it is less than 20%, the effects as a surface-protecting performance to prevent degradation of the substrate, tend to be low.

A weather-resistant film of the present invention may be used for various applications with the front surface layer having subjected to printing. Further, for the bonding of the weather-resistant film of the present invention to various substrate, common adhesives of e.g. epoxy resin type, acrylate resin type or urethane resin type, can be used. Further, a pressure sensitive adhesive using natural rubber of an acrylate resin, may preliminarily coated on the bond surface of the weather-resistant film before use. Depending upon the type of the substrate, the bonding may simply be conducted by heat treatment only.

The fluorine resin type weather-resistant film of the present invention can be extruded by means of a co-extrusion molding method whereby a plurality of layers are usually integrally bonded.

It is also possible to use a T-die wherein a plurality of extrusion molding machines are employed to bond resins in a molten state to form a multi-layer structure. The co-extrusion molding method includes a method using a multi manifold die wherein a plurality of resin layers are formed into sheets and then brought in contact to one another for bonding, and a method wherein a plurality of resins are bonded and then stretched into a sheet form. Further, a multi-layer film may be formed by a so-called inflation molding method wherein a round die is employed. To incorporate additives such as an inorganic pigment, a ultraviolet absorber, etc. to the layer comprising PVDF and PMMA as resin components, a method of preliminarily mixing the resins and the additives, followed by melt-kneading by means of a commonly employed single screw extruder, may be employed. However, by such a method, the distribution of the additives into the resin tends to be inadequate. Therefore, it is preferred to employ a twin screw extruder of high kneading performance, whereby starting material having excellent surface condition can be provided. As a method for further improving the dispersibility, a part or whole of PVDF and/or PMMA may be used in a powder form.

Now, the present invention will be described in further detail with reference to Examples and Comparative Examples. However, the present invention is by no means restricted to such specific Examples.

EXAMPLE 1

Preparation of Composition (A) as the Starting Material for the Front Surface Layer Film 70 parts by weight of "Solef 1010" trade name for polyvinylidene fluoride of Solvey Company, 15 parts by weight of "Acrypet MD" trade name for a methacrylate resin of Mitsubishi Rayon Company Limited and 15 parts by weight of "Delpet SR-6500" trade name for a methacrylate resin of Asahi Chemical Industries Company Limited, were mixed and then kneaded by a twin screw extruder to obtain a compound.

Preparation of Composition (B) as the Starting Material for the Rear Surface Layer Film 30 parts by weight of "Solef 1010" trade name for polyvinylidene fluoride of Solvey Company,. 35 parts by weight of "Acrypet MD" trade name for a methacrylate resin of Mitsubishi Rayon Company Limited, 35 parts by weight of "Delpet SR-6500" trade name for a methacrylate resin of Asahi Chemical Industries Company Limited and 3 parts by weight of 2-hydroxy-4-n-octoxybenzophenone as an ultraviolet absorber, were mixed and then kneaded by a twin screw extruder to obtain a compound.

Then, two types of compounds thus prepared were used as the starting materials, they were co-extruded by means of an apparatus provided with two extruders of 40 mm$\phi$, a feed block die and a coat hanger die having a width of 450 mm and a slit width of 0.4 mm, to obtain a film of double layer structure as shown in Table 1. The test results of the film thus obtained are shown in Table 1.

EXAMPLE 2

The operation was conducted in the same manner as in Example 1 except that the ultraviolet absorber for the composition (B) as the film material in Example 1 was changed to 2-(3,5-di-t-butyl-2-hydroxyphenyl)-5-chlorobenzotriazole. The results are shown in Table 1.

EXAMPLE 3

The operation was conducted in the same manner as in Example 1 except that the ultraviolet absorber for the composition (B) as the film material in Example 1 was changed to bis-(2,2,6,6-tetramethyl-4-piperidyl) sebacate. The results are shown in Table 1.

EXAMPLE 4

Preparation of Composition (A) as the Starting Material for the Front Surface Layer and Rear Surface Layer Films 80 parts by weight of "Solef 1010" trade name for polyvinylidene fluoride of Solvey Company, 10 parts by weight of "Acrypet MD" trade name for a methacrylate resin of Mitsubishi Rayon Company Limited and 10 parts by weight of "Delpet SR-6500" trade name for a methacrylate as Asahi Chemical Industries Company Limited, were mixed and then kneaded by a twin screw extruder to obtain a compound.

Preparation of Composition (B) as the Starting Material for the Intermediate Layer Film 50 parts by weight of "Solef 1010" trade name for polyvinylidene fluoride of Solvey Company, 25 parts by weight of "Acrypet MD" trade name for a methacrylate resin of Mitsubishi Rayon Company Limited, 25 parts by weight of "Delpet SR-6500" trade name for methacrylate resin of Asahi Chemical Industries Company Limited and 3 parts by weight of 2-hydroxy-4-n-octoxybenzophenone as an ultraviolet absorber, were mixed and then kneaded by a twin screw extruder to obtain a compound.

Then, three layer co-extrusion molding was conducted by means of three extruders of 40 mm$\phi$, a feed block die and a coat hanger die having a width of 450 mm and a slit width of 0.3 mm. The take up roll closest to the coat hanger die was cooled with water. The results are shown in Table 1.

COMPARATIVE EXAMPLE 1

The operation was conducted in the same manner as in Example 1 except that as the front surface layer, the composition (A) as the starting material for film in Example 1 was used and as the rear surface layer, the composition (B) as the starting material for film in Example 1 containing no ultraviolet absorber was used.

COMPARATIVE EXAMPLE 2

The operation was conducted in the same manner as in Example 4 except that as the front surface layer and the rear surface layer, the composition (A) as the starting material for film in Example 4, and as the intermediate layer, the composition (B) as the starting material for film in Example 4 containing no ultraviolet absorber was used. The results are shown in Table 1.

EXAMPLE 5

The operation was conducted in the same manner as in Example 1 except that with the same formulation as in Example 1, the ratio in thickness of the front surface layer and the rear surface layer was changed as shown in Table 1. The results are shown in Table 1.

COMPARATIVE EXAMPLE 3

The operation was conducted in the same manner as in Example 1 except that in Example 1, as the starting material for the front surface layer, 100 parts by weight of the polyvinylidene fluoride, 20 parts by weight of the methacrylate resin and 1.0 part by weight of 2-(2'-hydroxy-3',5'-di-tert-butylphenyl)-5-chlorobenzotriazole were used, and as the rear surface layer, 100 parts by weight of the methacrylate resin and 0.5 part by weight of the same ultraviolet absorber as in the front surface layer was used to obtain a film of multilayer structure having a ratio in thickness of the front surface layer and the rear surface layer as shown in Table 1. The results are shown in Table 1.

APPLICATION EXAMPLE

Using the weather-resistant films of Examples 1 to 5 and Comparative Examples 1 to 3, the rear surface layer of each of the weather-resistant film was bonded to a vinylchloride resin plate (hereinafter referred to as a PVC plate) or a styrene-buthadiene-acrylonitrile polymer resin plate (hereinafter referred to as an ABS plate), and the physical properties were measured. The results are shown in Table 1.

Further, in each of Example 5 and Comparative Example 3, the film of multi-layer structure was laminated by heat lamination on a soft PVC film of 44 $\mu$m to obtain a three-layered product, which was used for the test.

TABLE 1

| | Film thickness ($\mu$m) 1) | | Stain resistance 3) | Chemical resistance 4) | Weather resistance 5) | Bond durability 6) | Substrate for bonding, and bonding method 7) | |
|---|---|---|---|---|---|---|---|---|
| | Front surface layer/ intermediate layer/ rear surface layer | Total thickness | | | | | | |
| Example 1 | 15/30/— | 45 | o | o | No abnormality | 100/100 | PVC plate | Heat |
| Example 2 | 15/30/— | 45 | o | o | No abnormality | 100/100 | PVC plate | Heat |
| Example 3 | 15/30/— | 45 | o | o | No abnormality | 100/100 | PVC plate | Heat |
| Example 4 | 10/20/10 | 40 | o | o | No | 100/100 | ABS plate | Heat |

TABLE 1-continued

| | Film thickness (μm) Front surface layer/ intermediate layer/ rear surface layer | Total thickness | Stain resistance 3) | Chemical resistance 4) | Weather resistance 5) | Bond durability 6) | Substrate for bonding, and bonding method 7) | |
|---|---|---|---|---|---|---|---|---|
| Example 5 | 3/9/— | 12 | o | o | No abnormality | 100/100 | Soft PVC film | Heat |
| Comparative Example 1 | 15/30/— | 45 | o | o | Color change to brown | 5/100 | PVC plate | Heat |
| Comparative Example 2 | 10/20/10 | 40 | o | o | Color change to brown | 3/100 | ABS plate | Heat |
| Comparative Example 3 | 8/22/— | 30 | o | o | No abnormality | 10/100 | Soft PVC film | Heat |

EXAMPLE 6

Preparation of Composition (A) as the Starting Material for the Front Surface Layer Film 70 parts by weight of "Solef 1010" trade name for polyvinylidene fluoride of Solvey Company, 15 parts by weight of "Acrypet MD" trade name for a methacrylate resin of Mitsubishi Rayon Company Limited, 15 parts by weight of "Delpet SR-6500" trade name for a methacrylate resin of Asahi Chemical Industries Company Limited and 25 parts by weight of inorganic pigment having the color adjusted to 2.5 YR 3.0/1.0 (brown) as a pigment mixture, was mixed and then kneaded by a twin screw extruder to obtain a compound.

Preparation of Composition (B) as the Starting Material for the Rear Surface Layer Film 30 parts by weight of "Solef 1010" trade name for polyvinylidene fluoride of Solvey Company, 35 parts by weight of "Acrypet MD" trade name for a methacrylate resin of Mitsubishi Rayon Company Limited, 35 parts by weight of "Delpet SR-6500" trade name for a methacrylate resin of Asahi Chemical Industries Company Limited, 3 parts by weight of 2-hydroxy-4-n-octooxybenzophenone as an ultraviolet absorber and 25 parts by weight of inorganic pigment having the color adjusted to 2.5 YR 3.1/1.0 (brown) as a pigment mixture, were mixed and then kneaded by a twin screw extruder to obtain a compound.

Preparation of a Film

The two types of compounds obtained by the above method were used as the starting materials, and they were extrusion molded by means of an apparatus provided with two extruders of 40 mmφ, a feed block die and a coat hanger die having a width of 450 mm and a slit of 0.4 mm, to obtain a film as identified in Table 2. The physical properties were measured, and the results are shown in Table 2.

EXAMPLE 7

The operation was conducted in the same manner as in Example 6 except that the ultraviolet absorber for the composition (B) as the material for film in Example 6 was changed to 2-(3,5-di-t-butyl-2-hydroxybutyl)-5-chlorobenzotriazole. The physical properties were measured, and the results are shown in Table 2.

EXAMPLE 8

The operation was conducted in the same manner as in Example 6 except that the ultraviolet absorber for the composition (B) as the material for film in Example 6 was changed to bis-(2,2,6,6-tetramethyl-4-piperidyl)-sebacate. The physical properties were measured, and the results are shown in TABLE 2.

EXAMPLE 9

Preparation of Composition (A) as the Starting Material for the Front Surface Layer and Rear Surface Layer Films 70 parts by weight of "Solef 1010" trade name for polyvinylidene fluoride of Solvey Company, 15 parts by weight of "Acrypet MD" trade name for a methacrylate resin of Mitsubishi Rayon Company Limited, 15 parts by weight of "Delpet SR-6500" trade name for a methacrylate resin of Asahi Chemical Industries Company Limited and 25 parts by weight of inorganic pigment having the color adjusted to 2.5 YR 3.0/1.0 (brown) as a pigment mixture were mixed and then kneaded by a twin screw extruder to obtain a compound.

Preparation of Composition (B) as the Starting Material for an Intermediate Layer Film 30 parts by weight of "Solef 1010" trade name for polyvinylidene fluoride of Solvey Company, 35 parts by weight of "Acrypet MD" trade name for a methacrylate resin of Mitsubishi Rayon Company Limited, 35 parts by weight of "Delpet SR-6500" trade name for a methacrylate resin of Asahi Chemical Industries Company Limited, 3 parts by weight of 2-hydroxy-4-n-octooxybenzophenone as an ultraviolet absorber and 25 parts by weight of inorganic pigment having the color adjusted to 2.5 YR 3.0/1.0 (brown) as a pigment mixture, were mixed and then kneaded by a twin screw extruder to obtain a compound.

Preparation of a Film

Then, two types of compounds thus prepared were used as starting materials, and they were subjected to coextrusion molding by means of an apparatus provided with three extruders of 40 mmφ, a feed block die and a coat hanger die having a width of 450 mm and a slit width of 0.3 mmφ, to obtain a film of three-layer structure as shown in Table 2. The physical properties were measured, and the results are shown in Table 2.

EXAMPLE 10

Preparation of Composition (A) as the Starting Material for the Front Surface Layer and Rear Surface Layer Films 70 parts by weight of "Solef 1010" trade name for polyvinylidene fluoride of Solvey Company, 30 parts by weight of "Acrypet MD" trade name for a methacrylate resin of Mitsubishi Rayon Company Limited and 25 parts by weight of inorganic pigment having the color adjusted to 2.5 Y 8.2/2.0 (cream) as a pigment mixture, were mixed and then kneaded by a twin screw extruder to obtain a compound.

Preparation of Composition (B) as the Starting Material for an Intermediate Layer Film 60 parts by weight of "Solef 1010" trade name for polyvinylidene fluoride of Solvey Company, 40 parts by weight of "Acrypet MD" trade name for a methacrylate resin of Mitsubishi Rayon Company Limited and 5 parts by weight 2-hydroxy-4-n-octooxybenzophenone as an ultraviolet absorber, were mixed and then kneaded by a twin screw extruder to obtain a compound.

Thereafter the preparation of films was conducted in the same manner as in Example 9 to obtain a film of three layer structure as shown in Table 2. The physical properties were measured, and the results are shown in Table 2.

COMPARATIVE EXAMPLE 4

The operation was conducted in the same manner as in Example 6 except that in the compositions (A) and (B) as the starting materials for the front surface layer and rear surface layer films in Example 6, the inorganic pigment and the ultraviolet absorber were not used. The physical properties were measured and the results are shown in Table 2.

COMPARATIVE EXAMPLE 5

The operation was conducted in the same manner as in Example 9 except that in the compositions (A) and (B) as the starting materials for the front surface layer, intermediate layer and rear surface layer films in Example 9, the inorganic pigment and the ultraviolet absorber were not used. The physical properties were measured, and the results are shown in Table 2.

APPLICATION EXAMPLE

The colored composite films of Examples 6 to 10 and Comparative Examples 4 and 5 were laminated to various substrates shown in Table 2, so that the rear surface layer of each film was bonded to various substrates by means of heat or an adhesive. The physical properties were measured, and the results are shown in the Table.

TABLE 2

| | Film thickness (μm) 1) | | Film properties | | | Weather resistance 5) | | Bond durability 6) | Substrate for bonding, and bonding method 7) | |
| --- | --- | --- | --- | --- | --- | --- | --- | --- | --- | --- |
| | Front surface layer/ intermediate layer/ rear surface layer | Total thickness | Covering power 2) CR value (%) | Stain resistance 3) | Chemical resistance 4) | ΔE | GR (%) | | | |
| Example 6 | 15/30 | 45 | 99.5 | ○ | ○ | 0.5 | 82 | 100/100 | PVC plate | Heat |
| Example 7 | 15/30 | 45 | 99.5 | ○ | ○ | 0.4 | 80 | 100/100 | Zn steel plate | Adhesive |
| Example 8 | 15/30 | 45 | 99.5 | ○ | ○ | 0.5 | 82 | 100/100 | Stainless steel plate | Adhesive |
| Example 9 | 10/20/10 | 40 | 99.5 | ○ | ○ | 0.5 | 81 | 100/100 | ABS plate | Heat |
| Example 10 | 10/20/10 | 40 | 99.5 | ○ | ○ | 0.4 | 80 | 100/100 | Al plate | Adhesive |
| Comparative Example 4 | 15/30 | 45 | 0 | ○ | ○ | 10.5 | — | 5/100 | PVC plate | Heat |
| Comparative Example 5 | 10/20/10 | 40 | 0 | ○ | ○ | 9.6 | — | 3/100 | ABS plate | Heat |

TEST METHODS AND MEASURING METHODS

1) Film thickness: Measured by using a peacock thickness meter with a gradation of 1/1,000 mm. In the case of a double layer structure, the thickness of the upper layer and the thickness of the lower layer were calculated from the ratio of the extruded amounts from the respective extruders.

2) Covering power: In accordance with JIS K-7105 (C.R value)

3) Stain resistance: The degree of stain was visually evaluated in accordance with JIS K-6902, provided that acetone was eliminated.
○: No change
△: Slight change 4) Chemical resistance: A reagent was dropped on the top layer of the film, and the appearance upon expiration of 24 hours at room temperature (23° C.) was visually evaluated.
Reagents used: 10% HCl,
10% $H_2SO_4$, 10% $CaCl_2$,
10% NaOH
○: No change
△: Slight change 5) Weather resistance: Accelerated test by means of due cycle weatherometer.
Black panel: 63° C.,
Spray: Present
The color difference (ΔEab) upon expiration of 1,000 hours and the gloss maintaining rate (GR) were measured by a color difference meter (color measuring color difference meter ND-101D, manufactured by Nippon Denshoku Kogyo K.K.)

6) Bond durability: Crosscut was imparted to the film side bonded to the substrate, and the test was conducted by a due cycle weather meter method. Upon expiration of 1,000 hours, the crosscut film was subjected to a peel test by means of an adhesive tape.
100/100: No peeling observed
0/100: Completely peeled off 7) Bonding to the substrate: The bonding was conducted by heat bonding at a temperature of from 140° to 170° C. in the case where the substrate was a plastic plate, and when the substrate was a metal plate, bonding was conducted by means of the following urethane type adhesive.

Adhesive: Hardrock LC-090 of Denki Kagaku Kyogyo K.K.
Drying: 120° C. for 3 minutes
Activation: 150° C. for 2 minutes
Bonding temperature: 150° C.

In each case, a roll laminator was used.

As is apparent from the foregoing description, the fluorine resin type weather-resistant film obtained by the present invention is excellent in the stain resistance and the chemical resistance, and yet it is provided with excellent long lasting weather resistance which is specific to the vinylidene fluoride resin, and it has a feature that the adhesion to the substrate does not decrease over a long period of time. Accordingly, it is possible to advantageously use the film for the interior and the exterior of buildings, particularly for the exterior where the influence of the direct sunlight is severe.

What is claimed is:

1. A weather-resistant fluorine-containing resin film of a multi-layer structure, comprising a front surface layer made of a composition, comprising, as main components, from 50 to 95 parts by weight of a vinylidine fluoride resin and from 5 to 50 parts by weight of a methacrylate resin and a rear surface layer made of a composition (B) comprising, as main components, from 50 to 95 arts by weight of a methacrylate resin, from 5 to 50 parts by weight of a vinylidine fluoride resin and from 0.1 to 15 parts by weight of an ultraviolet absorber, wherein the overall thickness of the film of multi-layer structure is from 10 to 150 μm, and the thickness of the front surface layer of the film was from 2 to 50 μm.

2. A weather-resistant fluorine-containing resin film of claim 1, wherein said vinylidene fluoride resin of composition (A) and composition (B) is selected form the group consisting of a homopolymer of vinylidene fluoride and a copolymer of vinylidene fluoride and a copolymerizable monomer selected from the group containing ethylene tetrafluoride, propylene hexafluoride, chlorethylene trifluoride and vinyl fluoride.

3. The weather-resistant fluorine-containing resin film of claim 1, wherein said methacrylate resin of said composition (A) and composition (B) is selected from the group-consisting of a homopolymer of methyl methacrylate and a copolymer of methyl methacrylate and a monomer copolymerizable therewith and a blend of polymethyl methacrylate and acrylate rubber.

4. The weather-resistant fluorine-containing resin film of claim 1, wherein said ultraviolet absorber is selected from the group consisting of 2-(3,5-di-(α-dimethylbenzil-2-hydroxyphenyl)benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-ethoxy-2'-ethyl oxalic acid bisanilide, 2-ethoxy-5-butyl-2'-ethyl oxalic acid bisanilide, 2-hydroxy-4-n-octoxy benzophenone, bis(1,2,2,6,6-pentamethyl-4-piperidyl) sebacate, bis(1,2,2,6,6,-tetramethyl-4-piperidyl) sebacate, dimethyl-2-(4-hydroxy-2,2,6,6-tetramethyl-1-piperidyl)ether, and 1-(2-3-(3,5-di-t-butyl-4-hydroxyphenyl) propyonyloxy)-2,2,6,6-T-tetramethyl piperidine.

5. A weather-resistant fluorine-containing resin film of a multi-layer structure, comprising a front surface layer and a rear surface layer both made of a composition (A) comprising, as main components, from 50 to 95 parts by weight of a vinylidine fluorine resin from 5 to 50 parts by weight of a methacrylate resin and an intermediate layer made of a composition (B) comprising, as main components, from 50 to 95 parts by weight of a methacrylate resin, from 5 to 50 parts by weight of a vinylidine fluoride resin and from 0.1 to 15 parts by weight of an ultraviolet absorber, wherein the overall thickness of the film of multi-layer structure is from 10 to 150 μm, and the thickness of the front surface layer of the film was from 2 to 50 μm.

6. The weather-resistant fluorine-containing resin film of claim 5, wherein said vinylidene fluoride resin of composition (A) and composition (B) is selected form the group consisting of a hompolymer of vinylidene fluoride and a copolymer of vinylidene fluoride and a copolymerizable monomer selected from the group containing ethylene tetrafluoride, propylene hexafluoride, chlorethylene trifluoride and vinyl fluoride.

7. The weather-resistant fluorine-containing resin film of claim 5, wherein said methacrylate resin of said composition (A) and composition (B) is selected from the group-consisting of a homopolymer of methyl methacrylate and a copolymer of methyl methacrylate and a monomer copolymerizable therewith and a blend of polymethyl methacrylate and acrylate rubber.

8. The weather-resistant fluorine-containing resin film of claim 5, wherein said ultraviolet absorber is selected from the group consisting of 2-(3,5-di-(α-dimethylbenzil-2-hydroxyphenyl) benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-ethoxy-2'-ethyl oxalic acid bisanilide, 2-ethoxy-5-t-butyl-2'-ethyl oxalic acid bisanilide, 2-hydroxy-4-octoxy benzophenone, bis(1,2,2,6,6-pentamethyl-4-piperidyl) sebacate, bis(1,2,2,6,6,-tetramethyl-4-piperidyl) sebacate, dimethyl-2-(4-hydroxy-2,2,6,6-tetramethyl-1-piperidyl)ether, and 1-(2-3-(3,5-di-t-butyl-4-hydroxyphenyl) propyonyloxy)-2,2,6,6-T-tetramethyl piperidine.

* * * * *